(12) United States Patent
Honda et al.

(10) Patent No.: US 7,244,896 B2
(45) Date of Patent: Jul. 17, 2007

(54) MULTIPOINT SCALE

(75) Inventors: Akihisa Honda, Tokyo (JP); Mikio Yamashita, Saitama (JP)

(73) Assignee: Tanita Corporation, Tokyo (JP)

( * ) Notice: Subject to any disclaimer, the term of this patent is extended or adjusted under 35 U.S.C. 154(b) by 168 days.

(21) Appl. No.: 10/895,838

(22) Filed: Jul. 22, 2004

(65) Prior Publication Data
US 2005/0103535 A1    May 19, 2005

Related U.S. Application Data

(60) Provisional application No. 60/519,618, filed on Nov. 14, 2003.

(51) Int. Cl.
*G01G 19/00* (2006.01)
(52) U.S. Cl. .................. 177/199; 177/184
(58) Field of Classification Search .............. 177/184, 177/187, 188, 189, 244, 238, 199
See application file for complete search history.

(56) References Cited

U.S. PATENT DOCUMENTS 4,669,558 A * 6/1987 Backu et al. ............... 177/187
4,993,506 A * 2/1991 Angel ........................ 177/211
6,407,351 B1 * 6/2002 Meyer et al. ............... 177/238

* cited by examiner

*Primary Examiner*—Vit Miska
*Assistant Examiner*—Sean Kayes
(74) *Attorney, Agent, or Firm*—McDermott Will & Emery LLP

(57) ABSTRACT

In a multipoint scale for weighing a load applied to a placement section by a plurality of weight sensor units, the weight sensor unit includes a weight sensor having a strain-sensitive part; a first flexible elastic member for receiving the load applied to the placement section; a load transmission part for transmitting the load from the first flexible elastic member to a power point of the weight sensor; a load support part for supporting a fulcrum of the weight sensor; and a second flexible elastic member for receiving the load applied to the load support part and for maintaining a direction of the load applied to the strain-sensitive part of the weight sensor to be vertical in accordance with a deflection of the first flexible elastic member. Torsion of the weight sensor is avoided by reducing the effect of deflection of the placement section on transmission of the load to the weight sensor. Because the effect of the deflection of the placement section is reduced, a larger placement table can be used, and the placement table does not need to be a rigid body, enabling the use of a light-weight and inexpensive member or structure.

6 Claims, 2 Drawing Sheets

MULTIPOINT SCALE

CLAIM OF PRIORITY

This patent application, and any patent(s) issuing therefrom, claim priority from U.S. provisional patent application No. 60/519,618, filed on Nov. 14, 2003, entitled "SCALE (BABY SCALE)" which is incorporated herein by reference in its entirety.

FIELD OF THE INVENTION

The present invention relates to a multipoint scale having a plurality of weight sensor units.

BACKGROUND OF THE INVENTION

A conventional multipoint scale will be described using the example of a baby scale shown in FIGS. 4 to 6. A baby scale 1 shown in FIG. 4 has a length of up to 660 mm (about 26 inches) for weighing a baby by laying the baby on a placement table 2. In the placement table 2, the sides are downwardly inclined and an intermediate portion is gently U-shaped. In the center of the inclined surface of one side, there are provided an integrally arranged display 3 such as a liquid crystal display, a power-on and tare switch 4, and a power-off switch 5. Baby scale 1 is a four-point bathroom scale having weight sensor units, one for each of the vicinities of four corners of the placement table 2.

FIG. 5 shows a section along a line connecting the centers of two weight sensor units S1 and S2 disposed at two corners in the longitudinal direction when baby scale 1 is placed on a setting surface G such as a floor. Two other weight sensor units S3 and S4 (not shown) are arranged in the same way at two corners on the other side of scale 1.

The weight sensor unit S1 employs a known weight sensor 6 comprising a strain-sensitive part 6a having a strain gage as disclosed, for example, in U.S. Pat. No. 4,993,506. A power point of the weight sensor 6 is fixed to a casing 9 supporting the placement table 2 with a substantially disk-shaped load transmission plate 7 therebetween. A fulcrum is fixed to a fixed leg 10 with a substantially disk-shaped load support plate 8 therebetween. The weight sensor 6 is covered with a protection cover 11.

During weight measurement with the baby scale 1, as shown in FIG. 6, the load transmission plate 7 is inclined in accordance with deflections of the placement table 2 and the casing 9 due to a load, so that the load is slantingly applied to the weight sensor 6. At this time, since load support plate 8 supporting fulcrums of the weight sensor 6 is fixed to the surface G via fixed leg 10, the fulcrums of the weight sensor 6 are not inclined. Accordingly, because of the inclination of the load applied to the power point of the weight sensor 6, torsion is produced in the strain-sensitive part 6a of the weight sensor 6, generating a moment due to the torsion. The strain gage of the strain-sensitive part 6a is affected by the moment due to the torsion, disadvantageously reducing the accuracy of the weight measurement. Moreover, the linearity of the weight measurement tends to be significantly reduced because the degree of incline changes with the load, varying its influence.

To cancel the torsion of the strain-sensitive part 6a mentioned above, the prior art has provided a scale wherein the fulcrums of the weight sensor 6 are movable, so the entire weight sensor 6 is inclined in accordance with the deflecting direction of the placement table 2 and the load applied to the placement table 2 is always perpendicular to the strain-sensitive part 6a of the weight sensor 6. A known movable mechanism including a hardball and a spherical recess arranged between the load support plate 8 and the fixed leg 10 is used so that the load support plate 8 is freely inclined by the hardball rolling on the spherical recess in accordance with the inclination. However, as the area and/or flexibility of the placement table 2 increases, the strain produced in the placement table 2 increases and its inclination is also increased, so that displacement may be generated in the movable mechanism, reducing accuracy in the measurement.

Another conventional scale has a placement table 2 that is substantially a rigid body in material or structure, so that the deflection is suppressed to reduce the inclination of the load applied to the strain-sensitive part 6a. However, the scale itself is heavy and costly. Moreover, since the weight sensor units S1, S2, S3, and S4 are independently attached to the casing 9, if the placement table 2 is laterally pressed, for example, positional displacements of the fixed leg 10 and the load support plate 8 relative to the setting surface G may be independently generated in the weight sensor units S1, S2, S3, and S4, depending on the initial position of the baby scale 1. The displacement of the fulcrum of each weight sensor 6 from their initial state due to these positional displacements generates a torsional moment or a bending moment in each strain-sensitive part 6a. Since the above-mentioned moment is different in each of the weight sensor units S1, S2, S3, and S4, the balance between the four sides and the linearity of a Wheatstone bridge composed of the four weight sensors 6 may deteriorate, adversely affecting measurement accuracy.

SUMMARY OF THE INVENTION

The present invention addresses and solves the problems described above by providing a multipoint scale capable of stably measuring weight and avoiding deflection of its placement section.

An advantage of the present invention is a multipoint scale for weighing a load applied to a placement section by a plurality of weight sensor units, each weight sensor unit including a weight sensor having a strain-sensitive part; a first flexible elastic member for receiving the load applied to the placement section; a load transmission part for transmitting the load from the first flexible elastic member to a power point of the weight sensor; a load support part for supporting a fulcrum of the weight sensor; and a second flexible elastic member for receiving the load applied to the load support part and maintaining a direction of the load applied to the strain-sensitive part of the weight sensor to be vertical in accordance with a deflection of the first flexible elastic member. Accordingly, the load can be transmitted to the weight sensor by reducing the effect due to the deflection of the placement section, enabling the torsion of the weight sensor to be avoided. Also, because of the reduced effect due to the deflection of the placement section, the scale is applicable to a placement table with a more large area, and the material of the placement table is not necessary to have a member or a structure similar to a rigid body, enabling to have a light-weight and inexpensive member or structure.

Another advantage of the present invention is a multipoint scale including a fixing part for integrally fixing the second flexible elastic members of the plurality of weight sensor units at a predetermined position. Therefore, even when pressure is applied to the multipoint scale from a lateral direction, the weight sensors integrally move without producing independent displacements, so that in a combining circuit for computing the weight, the effect of the moment applied to the strain-sensitive part is cancelled. When the lateral pressure is cancelled, since the initial state is returned without disturbing the state of the weight sensors, linearity is maintained.

A further advantage of the present invention is a multipoint scale wherein the fixing part includes a plurality of leg parts provided on the bottom surface of the fixing part, the leg parts being freely movable in accordance with inclination or irregularity of a setting surface. Thus, the placement table and the weight sensor unit are always maintained in a horizontal position, enabling the measurement to be performed with high accuracy.

A further advantage of the present invention is a multipoint scale wherein the leg part includes a spherical recess that is in contact with a spherical projection provided in the fixing part and has a radius larger than that of the spherical projection, and the direction of the leg part is changeable relative to the setting surface employing a contact point between the spherical projection and the spherical recess as a fulcrum. As a result, the leg part comes firmly into contact with the setting surface, while the fixing part can receive the load in a perpendicular direction independently of the inclination of the leg part, enabling the measurement to be performed with high accuracy.

A further advantage of the present invention is a multipoint scale wherein the leg part further includes a leg-adjustment member for adjusting a height from the setting surface to the fixing part. The placement table and the weight sensor unit can thereby be maintained to be horizontal independent of the inclination of the setting surface.

A further advantage of the present invention is a multipoint scale wherein the first and second flexible elastic members are rubber materials. Thus, changes in the load direction due to the deflection of the placement table are dispersed in the flexible elastic member, reducing the effect on the weight sensor of changes in the load direction. Also, by using a versatile member such as an O-ring for the first and second elastic members, the cost of the inventive scale can be reduced.

Additional advantages of the present invention will become readily apparent to those skilled in this art from the following detailed description, wherein only one exemplary embodiment of the present invention is shown and described, simply by way of illustration of the best mode contemplated for carrying out the present invention. As will be realized, the present invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

An embodiment of a multipoint scale according to the present invention will now be described using the example of a four-point baby scale. According to the present invention, by transmitting a load applied to a placement table to a weight sensor via a flexible elastic member, the effect of the deflection of the placement table due to the load on the weight sensor is suppressed. Furthermore, by applying the load substantially perpendicularly to the weight sensor and further providing the weight sensor flexible elastic member adjacent to the fulcrum to avoid a slight torsion applied to a strain-sensitive part of the weight sensor, the scale's linearity can be improved. The inventive scale is also applicable to a placement table with a larger area. In this case, the placement table does not need to have a member or a structure similar to a rigid body, but can employ a lightweight and inexpensive member or structure.

Moreover, by integrally fixing all four weight sensors to a fixing plate, the impact of lateral pressure applied to the placement table is buffered by the flexible elastic member. Simultaneously, the four weight sensors integrally move without producing independent displacements, so that in a circuit of a Wheatstone bridge consisting of the four weight sensors, the effect of the moment applied to the strain-sensitive part of each weight sensor is cancelled by the lateral pressure, enabling balance of the four sides of the bridge to be maintained. When the lateral pressure is cancelled, since the initial state is returned without disturbing the state of the weight sensors, the initial value and the linearity can be maintained.

Figure 1:
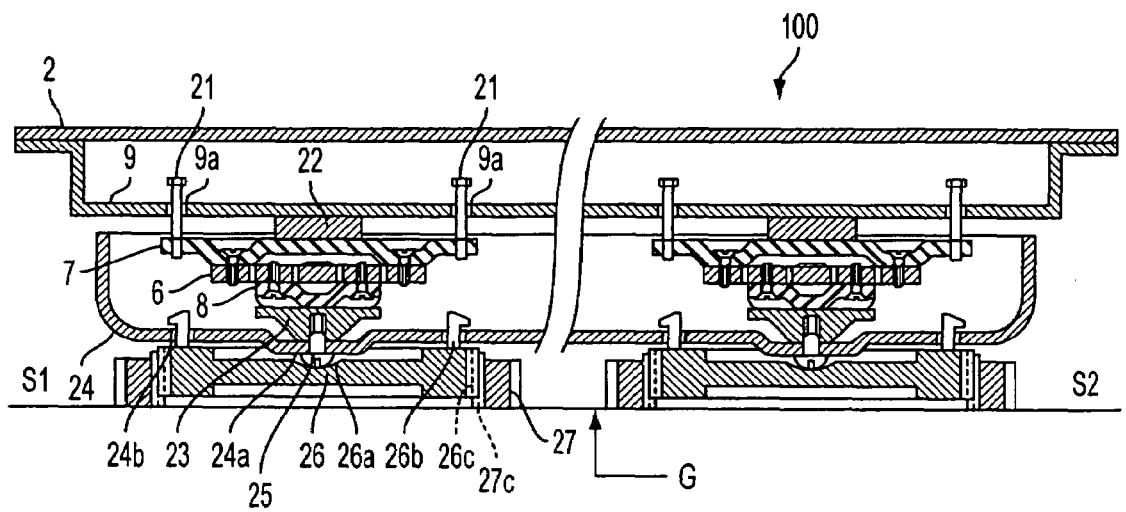
FIG. 1 is a sectional view at the line A-A of a multipoint scale according to an embodiment of the present invention.
Figure 4:
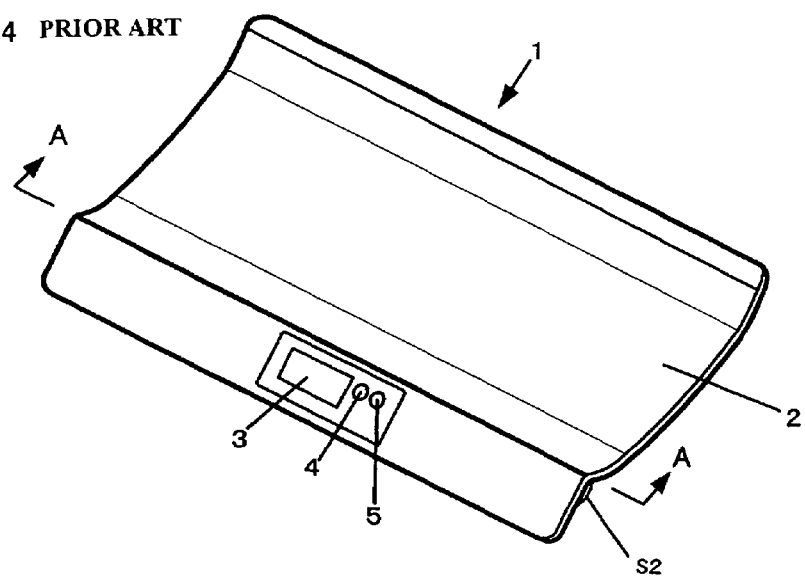
FIG. 4 is an exterior view of an example of a conventional multipoint scale.
Figure 5:
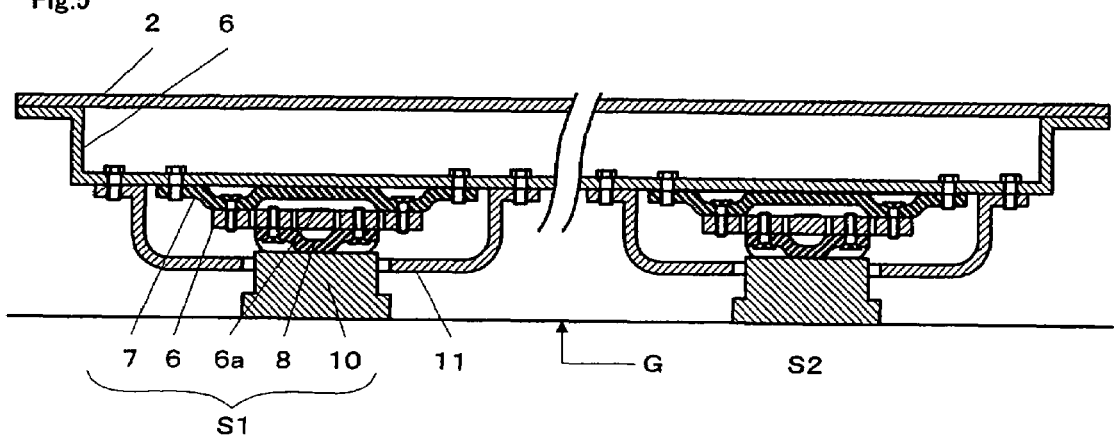
FIG. 5 is a sectional view at the line A-A of the multipoint scale shown in FIG. 4.
Figure 6:
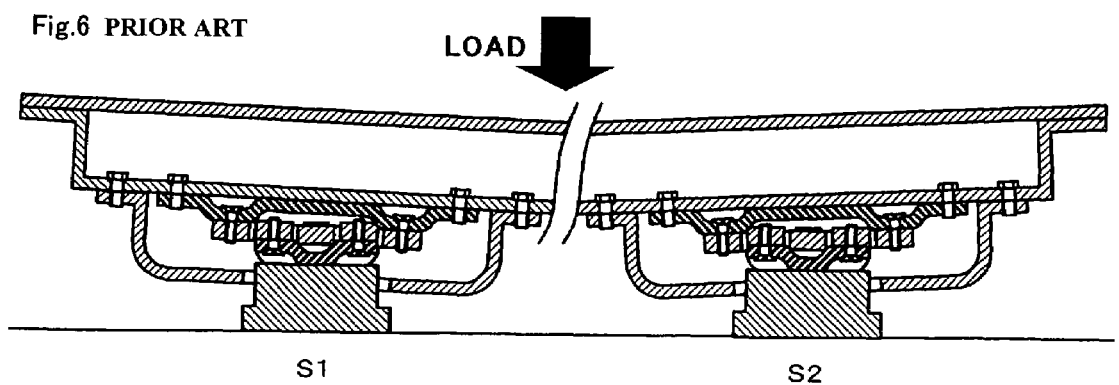
FIG. 6 is a drawing showing a loading state of the multipoint scale shown in FIG. 5.

The exterior view of a baby scale 100 according to the present invention is the same as that of the baby scale 1 shown in FIG. 4. FIG. 1 shows a sectional view at the line A-A of this embodiment of the present invention. The sectional view at the line A-A, in the same way as that of FIG. 5, is a section broken away along a line connecting centers of two weight sensor units S1 and S2 disposed at two corners in the longitudinal direction. The structure of the weight sensor unit S1 will be described by using like reference characters designating like elements common to FIG. 5.

At a power point of the weight sensor 6, a load transmission plate 7 for transmitting a load applied to the placement table 2 and the casing 9 is fixed, while at the fulcrum, a load support plate 8 is fixed. The load transmission plate 7 is fastened with bolts 21. Each bolt 21 is not directly fixed to the casing 9, but is vertically slidably mounted through an opening 9a formed in the casing 9. The head of each bolt 21 is within the casing 9 so that the bolt head cannot pass through the opening 9a even when it slides vertically. Each bolt 21 has an outer diameter such that the opening 9a is not in contact therewith in load and no load conditions. Furthermore, the load transmission plate 7 comes in contact with the casing 9 via a columnar first flexible elastic member 22 therebetween, and the first flexible elastic member 22 is made of foam rubber and is bonded to the center of the load transmission plate 7.

The load support plate 8 is fixed with a screw (not shown) on a second flexible elastic member 23 formed in a substantially truncated cone-shape with an upper surface having a larger diameter than a lower surface. A nut is embedded within the second flexible elastic member 23 on its bottom surface side. The load support plate 8, the second flexible elastic member 23, and a fixing plate 24 are integrally fixed by fastening a round-head screw 25 which is in contact with the fixing plate 24 having an opening 24a so as to mate with the nut formed within the second flexible elastic member 23.

The round-head screw 25 is arranged so as to come in contact with a spherical recess 26a formed in the center of a leg section 26 placed on the setting surface G. The spherical surface of the spherical recess 26a has a radius larger than that of the round head of the round head screw 25.

The leg section 26 is substantially columnar in shape (i.e., circular) and has hooks 26b penetrating openings 24b formed in the fixing plate 24 and a thread portion 26c formed in the external periphery. The leg section 26 further includes a leg-adjustment member 27 having a thread portion 27c mated with the thread portion 26c. When the leg-adjustment member 27 is rotated, the leg section 26 is not rotated because the two hooks 26b are retained in the openings 24b of the fixing plate 24, but the leg section 26 is raised by the thread portions 26c and 27c to adjust its height. Even when there is inclination or irregularity on the setting surface G, for example, the baby scale 100 can be maintained horizontal.

The structure of the weight sensor unit S1 has been exemplified above, and the other weight sensor units S2, S3, and S4 are also the same as the weight sensor unit S1, so that the description thereof is omitted.

Figure 2:
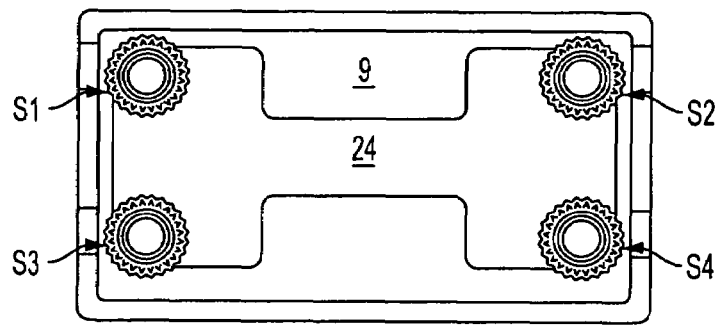
FIG. 2 is a bottom view of the multipoint scale according to the embodiment of FIG. 1.

The fixing plate 24, as shown in FIG. 2 which is a bottom view of the baby scale 100 according to this embodiment of the present invention, integrally connects the four weight sensor units S1, S2, S3, and S4 together with the second flexible elastic members 23 therebetween, respectively.

Although not shown, the four weight sensor units S1, S2, S3, and S4 constitute a circuit of a conventional Wheatstone bridge within the baby scale 100 so that weight values detected by the four weight sensors 6 are added. By integrally connecting the four weight sensor units S1, S2, S3, and S4 together to the fixing plate 24, when a lateral pressure is applied in a lateral direction to the placement table 2, the impact is buffered by the flexible elastic member. Moreover, since the four weight sensors 6 integrally move, in the Wheatstone bridge circuit, the effect of a torsional moment or a bending moment applied to each strain-sensitive part 6a is cancelled by the lateral pressure, enabling the balance of the four sides of the bridge to be maintained. When the lateral pressure is removed, since the initial state is returned without disturbing the state among the weight sensors, the initial value and the linearity can be maintained.

Figure 3:
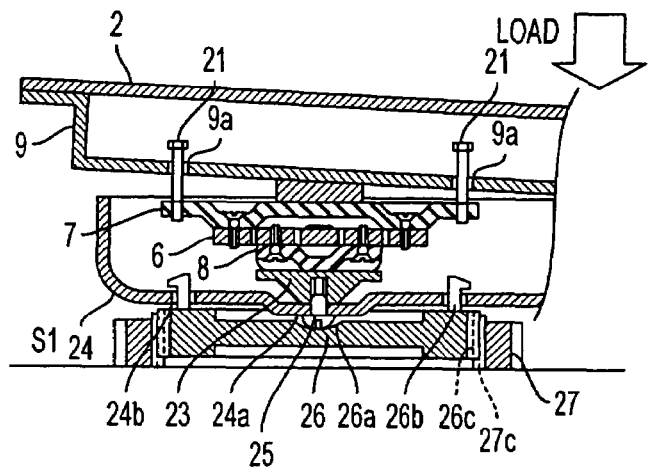
FIG. 3 is a drawing showing a loading state of the multipoint scale shown in FIG. 1.

The operation of the inventive scale during loading will be described with reference to FIG. 3 using an exemplary weight sensor unit S1. Since the weight sensor units S2, S3, and S4 operate in the same way, the description thereof is omitted.

If a large load is applied to the baby scale 100, deflections are produced in the placement table 2 and the casing 9. At this time, the load applied to the weight sensor unit S1 from the casing 9 in a slant direction is dispersed by flexible deflection of the first flexible elastic member 22 contacting the casing 9 to exert a force on the load transmission plate 7 contacting the first flexible elastic member 22 in a direction perpendicular thereto. Thus, the inclination of the load transmission plate 7 is extremely small relative to the inclination of the placement table 2. At this time, since the bolts 21 slide but do not contact the openings 9a of the casing 9, the load is transmitted to the load transmission plate 7 only by the first flexible elastic member 22.

Micro-changes in inclination of the load transmission plate 7 cause torsion in the strain-sensitive part 6a of the weight sensor 6; however, the second flexible elastic member 23 disposed in the load support plate 8 deflects to incline in accordance with the micro-inclination of the load transmission plate 7, so the vector direction of the load is maintained perpendicular to the weight sensor 6.

As described above, even if large deflections are produced in the placement table 2 and the casing 9, at a power point and a fulcrum of the weight sensor 6, displacement cannot be generated, enabling the weight measurement to be performed with stable linearity.

According to this embodiment of the invention, a four-point scale having four weight sensor units S1, S2, S3, and S4 has been exemplified; alternatively, a multipoint scale having three weight sensor units or more may be made according to the present invention.

The first flexible elastic member 22 and the second flexible elastic member 23 are formed in a columnar shape and a truncated cone shape, respectively; however, they are not limited thereto and as long as they can be suitably attached to the load transmission plate 7 and the load support plate 8 and can avoid the torsion applied to the weight sensor 6, any shape can be employed; for example, an existing O-ring may be employed.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only one embodiment of the present invention and but a few examples of its versatility are shown and described in the present disclosure. It is to be understood that the present invention is capable of use in various other combinations and environments and is capable of changes or modifications within the scope of the inventive concept as expressed herein.

REFERENCE NUMERALS 1,100: baby scale
2: placement table
3: display
4: power-on and tare switch
5: power-off switch
6: weight sensor
6a: strain gage
7: load transmission plate
8: load support plate
9: casing
9a: opening
10: fixed leg part
11: protection cover
21: bolt
22: first flexible elastic member
23: second flexible elastic member
24: fixing plate
24a: opening
24b: opening
25: screw
26: leg section
26a: spherical recess 27: leg-adjustment member
27c: thread portion

What is claimed is:

1. A multipoint scale having a plurality of weight sensor units for weighing a load applied to a placement section, each weight sensor unit comprising:
a weight sensor having a strain-sensitive part;
a first flexible elastic member for receiving the load applied to the placement section;
a load transmission part for transmitting the load from the first flexible elastic member to a power point of the weight sensor;
a load support part for supporting a fulcrum of the weight sensor; and
a second flexible elastic member for receiving the load applied to the load support part and for maintaining a direction of the load applied to the strain-sensitive part of the weight sensor to be vertical in accordance with a deflection of the first flexible elastic member;
wherein the weight sensors of the plurality of weight sensor units form a Wheatstone bridge circuit;
wherein the multipoint scale further includes a fixing plate for integrally connecting the plurality of weight sensors via the second flexible elastic members, the fixing plate fixing each of the second flexible elastic members at a predetermined position; and
wherein the Wheatstone bridge is configured to add weight values detected respectively by the strain-sensitive parts of the respective weight sensors, and to cancel the effects of a moment applied to the respective strain-sensitive parts when the weight sensors are moved integrally with respect to the fixing plate.

2. The scale according to claim 1, wherein the fixing plate comprises a plurality of leg parts provided on the bottom surface of the fixing plate, the leg parts being freely movable in accordance with inclination or irregularity of a setting surface.

3. The scale according to claim 2, wherein each leg part comprises a spherical recess that is in contact with a spherical projection in the fixing plate and has a radius larger than that of the spherical projection, and
wherein a direction of the leg part is changed relative to the setting surface employing a contact point between the spherical projection and the spherical recess as a fulcrum.

4. The scale according to claim 2, wherein the leg part further comprises a leg-adjustment member for adjusting a height from the setting surface to the fixing plate.

5. The scale according to claim 1, wherein the first flexible elastic member and the second flexible elastic member comprise rubber materials.

6. The scale according to claim 1, wherein the first flexible elastic member and the second flexible elastic member comprise O-rings.

* * * * *